(12) United States Patent
Wan et al.

(10) Patent No.: US 10,432,740 B2
(45) Date of Patent: Oct. 1, 2019

(54) METHOD AND APPARATUS FOR ACCESSING OTT APPLICATION AND PUSHING MESSAGE BY SERVER

(71) Applicant: HUAWEI TECHNOLOGIES CO., LTD., Shenzhen (CN)

(72) Inventors: Lei Wan, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 520 days.

(21) Appl. No.: 15/015,553

(22) Filed: Feb. 4, 2016

(65) Prior Publication Data
US 2016/0156728 A1 Jun. 2, 2016

Related U.S. Application Data

(63) Continuation of application No. PCT/CN2014/082275, filed on Jul. 15, 2014.

(30) Foreign Application Priority Data

Aug. 14, 2013 (CN) .......................... 2013 1 0354163

(51) Int. Cl.
*H04L 29/08* (2006.01)
*H04L 29/06* (2006.01)
*H04L 12/58* (2006.01)

(52) U.S. Cl.
CPC .............. *H04L 67/26* (2013.01); *H04L 51/38* (2013.01); *H04L 63/083* (2013.01); *H04L 63/10* (2013.01); *H04L 67/306* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 8,010,089 B2* | 8/2011 | Israel | H04L 67/04 455/414.1 |
| 8,995,318 B2* | 3/2015 | Atarius | H04W 8/183 370/310 |

(Continued)

FOREIGN PATENT DOCUMENTS

| | | |
|---|---|---|
| CN | 101183940 A | 5/2008 |
| CN | 102065082 A | 5/2011 |

(Continued)

OTHER PUBLICATIONS

International Search Report dated Oct. 29, 2014 in corresponding International Patent Application No. PCT/CN2014/082275.

(Continued)

*Primary Examiner* — Farid Homayounmehr
*Assistant Examiner* — Olanrewaju J. Bucknor
(74) *Attorney, Agent, or Firm* — Staas & Halsey LLP

(57) ABSTRACT

In the field of communications technologies, a method and an apparatus for accessing an OTT application are disclosed. By using the accessing method, a user can access multiple OTT applications by using one piece of first user information, and therefore, the user does not need to record first user information separately for each OTT application, so as to reduce complexity of accessing multiple OTT applications. Three types of methods and apparatuses for pushing a message by a server are further provided. By using the message pushing methods, a server can push a message to a terminal that registers but does not enable a related OTT application, and the server can also push a message to a terminal that does not register a corresponding OTT application, so that a terminal does not need to receive a message only if a related OTT application is enabled.

11 Claims, 14 Drawing Sheets

(56) References Cited

U.S. PATENT DOCUMENTS

| | | | |
|---|---|---|---|
| 9,466,086 B2* | 10/2016 | McEachern | G06Q 10/10 |
| 2009/0234814 A1* | 9/2009 | Boerries | G06Q 30/02 |
| 2012/0054068 A1* | 3/2012 | Connor | G06Q 30/0601 |
| | | | 705/26.41 |
| 2012/0296784 A1* | 11/2012 | Connor | H04L 12/1407 |
| | | | 705/34 |
| 2012/0331293 A1* | 12/2012 | Ma | H04L 9/0891 |
| | | | 713/168 |
| 2013/0040633 A1* | 2/2013 | Leeder | H04W 4/60 |
| | | | 455/422.1 |
| 2013/0139241 A1* | 5/2013 | Leeder | H04W 12/06 |
| | | | 726/9 |
| 2013/0173765 A1* | 7/2013 | Korbecki | H04N 21/42209 |
| | | | 709/221 |
| 2013/0198382 A1 | 8/2013 | Wang | |
| 2014/0018063 A1* | 1/2014 | Mattsson | H04W 12/06 |
| | | | 455/423 |
| 2014/0020060 A1* | 1/2014 | Kotecha | H04W 4/20 |
| | | | 726/3 |
| 2014/0089442 A1* | 3/2014 | Kim | H04W 4/005 |
| | | | 709/206 |
| 2014/0115125 A1 | 4/2014 | Chen | |
| 2014/0258481 A1* | 9/2014 | Lundell | H04L 67/34 |
| | | | 709/222 |
| 2014/0307549 A1* | 10/2014 | Kotecha | H04W 28/0268 |
| | | | 370/235 |
| 2014/0372624 A1* | 12/2014 | Wang | H04L 65/60 |
| | | | 709/231 |
| 2016/0173489 A1* | 6/2016 | Narayanan | G06F 21/44 |
| | | | 726/7 |

FOREIGN PATENT DOCUMENTS

| | | |
|---|---|---|
| CN | 102984046 | 3/2013 |
| CN | 103036770 A | 4/2013 |
| CN | 103166828 | 6/2013 |
| CN | 103188653 A | 7/2013 |
| CN | 103209392 A | 7/2013 |
| WO | WO-2012103726 A1 * | 8/2012 ....... H04L 29/08729 |

OTHER PUBLICATIONS

Xu et al., "Integrative transparent mechanism of one-to-many application access", Journal of Computer Applications, vol. 30, Supp. 12, Institute of Computer Applications, Chinese Academy of Engineering Physics, Dec. 2012, Mianyang Sichuan, China, 3 pages.

International Search Report dated Oct. 29, 2014, in corresponding International Application No. PCT/CN2014/082275.

Office Action, dated Apr. 1, 2017, in Chinese Application No. 201310354163.5 (7 pp.).

* cited by examiner

METHOD AND APPARATUS FOR ACCESSING OTT APPLICATION AND PUSHING MESSAGE BY SERVER

CROSS-REFERENCE TO RELATED APPLICATIONS

This application is a continuation of International Application No. PCT/CN2014/082275, filed on Jul. 15, 2014, which claims priority to Chinese Patent Application No. 201310354163.5, filed on Aug. 14, 2013, both of which are hereby incorporated by reference in their entireties.

TECHNICAL FIELD

Embodiments of the present invention relate to the field of communications technologies, and in particular, to a method and an apparatus for accessing an OTT application and pushing a message by a server.

BACKGROUND

With rapid development of over the top (OTT) applications, an increasingly high quantity of OTT applications appear currently, where the OTT applications refer to services developed by Internet enterprises by using a broadband network of an operator, for example, an instant messaging service and applications in various mobile application stores, and all these are OTT applications.

Currently, many OTT applications are respectively developed based on different servers. Different OTT applications each have a specific user group. In addition, these OTT applications developed based on different servers cannot use a same user account number, that is, different OTT applications can only use their respective user account numbers to access corresponding OTT servers, and a server corresponding to a different OTT application can only send a message to a terminal that is registered on the server.

In an actual application, the prior art has the following disadvantages:

a: As OTT applications increase, each time when a new OTT application is accessed, registration needs to be performed on a corresponding server to obtain corresponding user account number and password information (which are collectively referred to as first user information), and then access can be performed. The new OTT application cannot be accessed by using user account number and password information that are corresponding to another successfully registered OTT application, which is specifically shown in FIG. 1A. Therefore, there exists a problem that access to multiple OTT applications is complex.

b: A server can only push a message (such as news information and weather information) to a terminal that is registered on the server and enable a corresponding OTT application, but cannot push the message to a terminal that does not register the corresponding OTT application or does not enable the corresponding OTT application, but registers and enables another OTT application, which is specifically shown in FIG. 1B. Therefore, there exists a problem that a push manner and a push occasion are relatively undiversified when the server pushes a corresponding message to the corresponding OTT application.

SUMMARY

Embodiments of the present invention provide a method and an apparatus for accessing an OTT application, so as to resolve a problem existing in the prior art that access to multiple OTT applications is complex.

The embodiments of the present invention further provide a method and an apparatus for pushing a message by a server, so as to resolve a problem existing in the prior art that a push manner and a push occasion are relatively undiversified when a server pushes a message.

According to a first aspect, a method for accessing an OTT application is provided, including:

storing, by an interworking server, acquired first user information used by a user to register an OTT application, where the first user information is used by the user to access at least two OTT applications;

receiving, by the interworking server, second user information that is used by the user when the user accesses the OTT application; and determining, by the interworking server, whether the first user information matches the second user information, and if the first user information matches the second user information, allowing access of the user, or indicating that authentication of the user succeeds, so that the user accesses a server that is corresponding to an OTT application to be accessed; or if the first user information does not match the second user information, prohibiting access of the user, or indicating that authentication of the user fails, so that a server that is corresponding to an OTT application to be accessed rejects the access of the user.

With reference to the first aspect, in a first possible implementation manner, acquiring, by the interworking server, the first user information that is used by the user to register the OTT application includes:

if the user registers an OTT account by using the interworking server, directly acquiring, by the interworking server, the first user information; or if the user registers an OTT account by using a server corresponding to the OTT application, acquiring, by the interworking server, the first user information by using the user, or acquiring, by the interworking server, the first user information by using the server corresponding to the OTT application.

With reference to the first aspect or the first possible implementation manner of the first aspect, in a second possible implementation manner, after receiving the first user information that is used by the user to register the OTT application, and before storing the first user information, the interworking server receives a password corresponding to the first user information.

With reference to the first aspect or the first to the second possible implementation manners of the first aspect, in a third possible implementation manner, the receiving, by the interworking server, second user information that is carried by the user when the user accesses the OTT application includes:

receiving, by the interworking server by using a client corresponding to the server, second user information provided by the client when the user accesses the OTT application; or acquiring, by the interworking server by using a request that is redirected to the interworking server by the server that is corresponding to the OTT application to be accessed, second user information that is provided when the user accesses a second OTT application; or receiving, by the interworking server, second user information sent by the server that is corresponding to the OTT application to be accessed, where when the user accesses a second OTT application, the second user information is provided to the server corresponding to the OTT application.

With reference to the first aspect or the first to the second possible implementation manners of the first aspect, in a fourth possible implementation manner, after it is determined that the second user information is the first user information stored by the server, and when it is determined that a security level of the second user information reaches a preset security level threshold, the access of the user is allowed, or it indicates that the authentication of the user succeeds, so that the user accesses the server that is corresponding to the OTT application to be accessed.

According to a second aspect, a method for pushing a message by a server corresponding to an OTT application is provided, including:
  receiving a cross-OTT message push request that is sent by a server corresponding to a first OTT application, where the cross-OTT message push request is used by the server corresponding to the first OTT application to send a message to a user that does not access the first OTT application or does not register the first OTT application; and
  selecting, according to stored and acquired user information for registering an OTT application, a cross-OTT information receiving user that receives the message sent by the server corresponding to the first OTT application, and sending a message that is to be sent by the server corresponding to the first OTT application.

With reference to the second aspect, in a first possible implementation manner, the selecting a cross-OTT information receiving user that receives the message sent by the server corresponding to the first OTT application specifically includes:
  acquiring intention information of a user corresponding to the stored user information, and obtaining, according to the intention information of the user, a type of information that the user intends to receive; and
  selecting a user whose type of information that the user intends to receive matches a type of a message pushed by the first OTT application, as a cross-OTT information receiving user of the message that is to be sent by the server corresponding to the first OTT application.

With reference to the second aspect or the first possible implementation manner of the second aspect, in a second possible implementation manner, the sending a message that is to be sent by the server corresponding to the first OTT application includes:
  for each determined cross-OTT information receiving user, sending, by using a server accessed by the cross-OTT information receiving user, the received message that is sent by the server corresponding to the first OTT application, or directly sending the received message that is sent by the server corresponding to the first OTT application.

With reference to the second possible implementation manner of the second aspect, in a third possible implementation manner, for each determined cross-OTT information receiving user, after the received message that is sent by the server corresponding to the first OTT application is acquired, and before the received message is sent to the cross-OTT information receiving user by using the server accessed by the cross-OTT information receiving user, acquired access information of the cross-OTT information receiving user is stored.

With reference to the third possible implementation manner of the second aspect, in a fourth possible implementation manner, acquiring the access information of the cross-OTT information receiving user specifically includes:
  if the cross-OTT information receiving user accesses another server, receiving access information that is sent by the server accessed by the cross-OTT information receiving user; or
  if the cross-OTT information receiving user accesses the server, acquiring the access information of the cross-OTT information receiving user directly from the server.

According to a third aspect, a method for pushing a message by a server corresponding to an OTT application is provided, including:
  receiving a cross-OTT message push request that is sent by a server corresponding to a first OTT application, where the cross-OTT message push request is used by the server corresponding to the first OTT application to send a message to a user that registers but does not access the first OTT application or does not register the first OTT application; and
  selecting, according to stored and acquired user information for registering an OTT application, a cross-OTT information receiving user that receives the message sent by the server corresponding to the first OTT application, and sending information about the selected cross-OTT information receiving user to the server corresponding to the first OTT application, so that the server corresponding to the first OTT application sends to-be-pushed information to the selected cross-OTT information receiving user.

According to a fourth aspect, a method for pushing a message by a server corresponding to an OTT application is provided, including:
  acquiring, according to stored and acquired user information for accessing an OTT application, OTT information including at least user access information; and
  sending the acquired OTT information to a server corresponding to the first OTT application, so that the server corresponding to the first OTT application determines a cross-OTT information receiving user to which a message is to be pushed, and pushes the to-be-pushed message to the cross-OTT information receiving user.

With reference to the fourth aspect, in a first possible implementation manner, the acquired OTT information further includes: intention information of a user, where the intention information of the user carries at least a type of information that the user intends to receive.

According to a fifth aspect, an interworking server is provided, including:
  an information storage module, configured to store acquired first user information used by a user to register an OTT application, where the first user information is used by the user to access at least two OTT applications;
  an information acquiring module, configured to receive second user information that is used by the user when the user accesses the OTT application; and
  a determining module, configured to determine whether the first user information matches the second user information, and if the first user information matches the second user information, allow access of the user, or indicate that authentication of the user succeeds, so that the user accesses a server that is corresponding to an OTT application to be accessed; or
  if the first user information does not match the second user information, prohibit access of the user, or indicate that authentication of the user fails, so that a server that is corresponding to an OTT application to be accessed rejects the access of the user.

With reference to the fifth aspect, in a first possible implementation manner, the information storage module is specifically configured to:
if the user registers an OTT account by using the interworking server, directly acquire the first user information; or
if the user registers an OTT account by using a server corresponding to the OTT application, acquire the first user information by using the user, or acquire the first user information by using the server corresponding to the OTT application.

With reference to the fifth aspect or the first possible implementation manner of the fifth aspect, in a second possible implementation manner, the information storage module is further configured to:
after receiving the first user information that is used by the user to register the OTT application, and before storing the first user information, receive a password corresponding to the first user information.

With reference to the fifth aspect or the first to the second possible implementation manners of the fifth aspect, in a third possible implementation manner, the information acquiring module is specifically configured to:
receive, by using a client corresponding to the server, second user information provided by the client when the user accesses the OTT application; or
acquire, by using a request that is redirected to the server by the server that is corresponding to the OTT application to be accessed, second user information that is provided when the user accesses a second OTT application; or
receive second user information sent by the server that is corresponding to the OTT application to be accessed, where when the user accesses a second OTT application, the second user information is provided to the server corresponding to the OTT application.

With reference to the fifth aspect or the first to the second possible implementation manners of the fifth aspect, in a fourth possible implementation manner, the determining module is further configured to:
after it is determined that the second user information is the first user information stored by the server, and when it is determined that a security level of the second user information reaches a preset security level threshold, allow the access of the user, or indicate that the authentication of the user succeeds, so that the user accesses the server that is corresponding to the OTT application to be accessed.

According to a sixth aspect, an interworking server is provided, including:
a first receiving module, configured to receive a cross-OTT message push request that is sent by a server corresponding to a first OTT application, where the cross-OTT message push request is used by the server corresponding to the first OTT application to send a message to a user that does not access the first OTT application or does not register the first OTT application; and
a sending module, configured to select, according to stored and acquired user information for registering the OTT application, a cross-OTT information receiving user that receives the message sent by the server corresponding to the first OTT application, and send a message that is to be sent by the server corresponding to the first OTT application.

With reference to the sixth aspect, in a first possible implementation manner, the sending module is specifically configured to:
acquire intention information of a user corresponding to the stored user information, and obtain, according to the intention information of the user, a type of information that the user intends to receive; and
select a user whose type of information that the user intends to receive matches a type of a message pushed by the first OTT application, as a cross-OTT information receiving user of the message that is to be sent by the server corresponding to the first OTT application.

With reference to the sixth aspect or the first possible implementation manner of the sixth aspect, in a second possible implementation manner, the sending module is specifically configured to:
for each determined cross-OTT information receiving user, send, by using a server accessed by the cross-OTT information receiving user, the received message that is sent by the server corresponding to the first OTT application, or directly send the received message that is sent by the server corresponding to the first OTT application.

With reference to the second possible implementation manner of the sixth aspect, in a third possible implementation manner, the sending module is further configured to:
for each determined cross-OTT information receiving user, after the received message that is sent by the server corresponding to the first OTT application is acquired, and before the received message is sent to the cross-OTT information receiving user by using the server accessed by the cross-OTT information receiving user, store acquired access information of the cross-OTT information receiving user.

With reference to the third possible implementation manner of the sixth aspect, in a fourth possible implementation manner, the sending module is specifically configured to:
if the cross-OTT information receiving user accesses another server, receive access information that is sent by the server accessed by the cross-OTT information receiving user; or
if the cross-OTT information receiving user accesses the server, acquire the access information of the cross-OTT information receiving user directly from the server.

According to a seventh aspect, an interworking server is provided, including:
a second receiving module, configured to receive a cross-OTT message push request that is sent by a server corresponding to a first OTT application, where the cross-OTT message push request is used by the server corresponding to the first OTT application to send a message to a user that registers but does not access the first OTT application or does not register the first OTT application; and
an information determining module, configured to select, according to stored and acquired user information for registering the OTT application, a cross-OTT information receiving user that receives the message sent by the server corresponding to the first OTT application, and send information about the selected cross-OTT information receiving user to the server corresponding to the first OTT application, so that the server corresponding to the first OTT application sends to-be-pushed information to the selected cross-OTT information receiving user.

According to an eighth aspect, an interworking server is provided, including:

an acquiring module, configured to acquire, according to stored and acquired user information for accessing an OTT application, OTT information including at least user access information; and an information sending module, configured to send the acquired OTT information to a server corresponding to the first OTT application, so that the server corresponding to the first OTT application determines a cross-OTT information receiving user to which a message is to be pushed, and pushes the to-be-pushed message to the cross-OTT information receiving user.

With reference to the eighth aspect, in a first possible implementation manner, the OTT information acquired by the acquiring module further includes: intention information of a user, where the intention information of the user carries at least a type of information that the user intends to receive.

Beneficial effects of the present invention are as follows:

In the embodiments of the present invention, to resolve a problem existing in the prior art that access to multiple OTT applications is complex, a method and an apparatus for accessing an OTT application are disclosed. By using the accessing method, a user can access multiple OTT applications by using one piece of first user information, and therefore, the user does not need to record first user information separately for each OTT application, so as to reduce complexity of accessing multiple OTT applications. To resolve a problem existing in the prior art that a push manner and a push occasion are relatively undiversified when a server pushes a message, three types of methods and apparatuses for pushing a message by a server are further provided. By using the message pushing methods, a server can push a message to a terminal that registers but does not enable a related OTT application, and the server can also push a message to a terminal that does not register a corresponding OTT application, so that a terminal is not limited to receiving the message only if a related OTT application is enabled. Therefore, the problem existing in the prior art that a push manner and a push occasion are relatively undiversified when a server pushes a message is resolved.

DESCRIPTION OF EMBODIMENTS

Figure 1A:
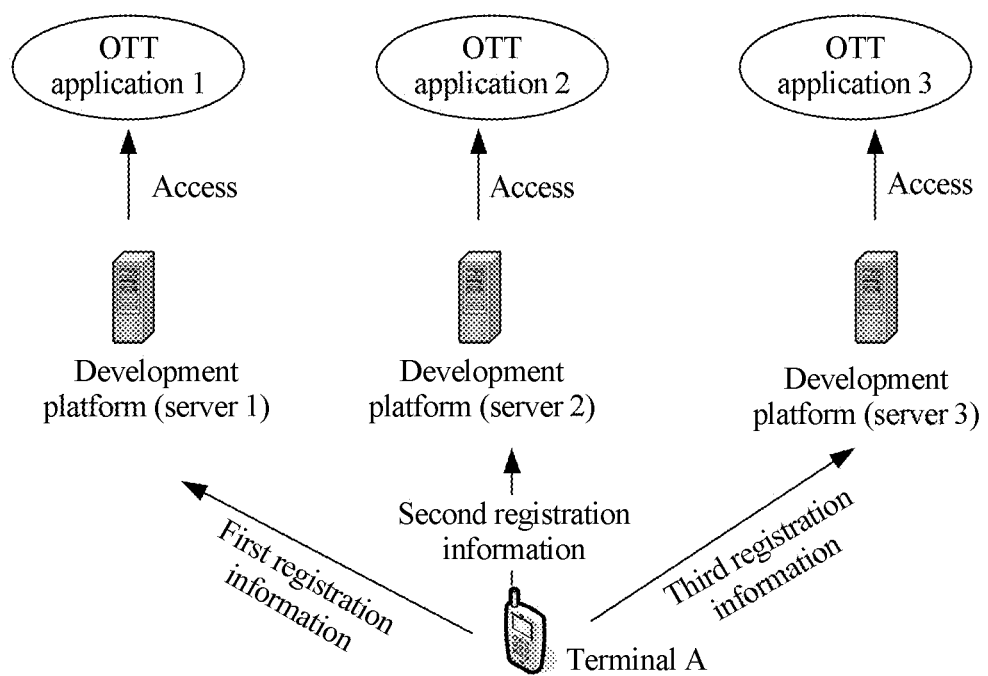
FIG. 1A is a schematic diagram of accessing multiple OTT applications by a terminal in the prior art.
Figure 1B:
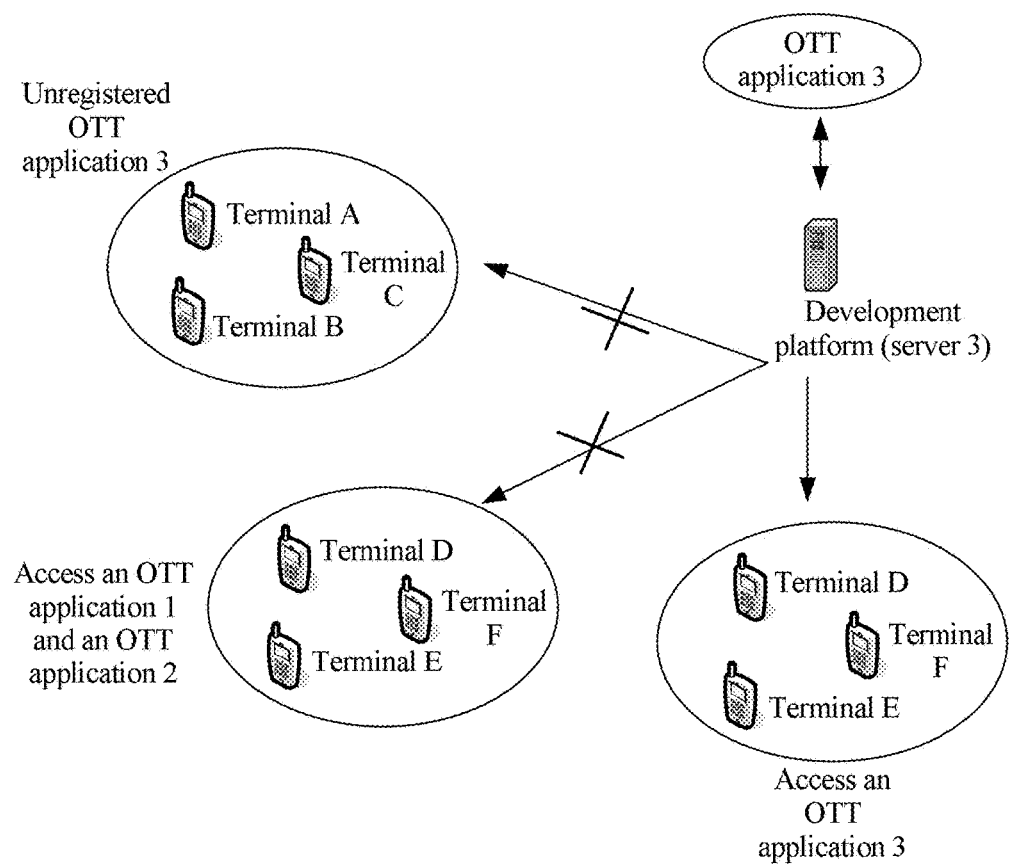
FIG. 1B is a schematic diagram of pushing a message by a server corresponding to an OTT application in the prior art.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

To resolve a problem existing in the prior art that access to multiple OTT applications is complex, a method for accessing an OTT application is provided in embodiments of the present invention, which is specifically: storing, by an interworking server, acquired first user information used by a user to register an OTT application, where the first user information is used by the user to access at least two OTT applications; receiving, by the interworking server, second user information that is used by the user when the user accesses the OTT application; and determining, by the interworking server, whether the first user information matches the second user information, and if the first user information matches the second user information, allowing access of the user, or indicating that authentication of the user succeeds, so that the user accesses a server that is corresponding to an OTT application to be accessed; or if the first user information does not match the second user information, prohibiting access of the user, or indicating that authentication of the user fails, so that a server that is corresponding to an OTT application to be accessed rejects the access of the user. By using the accessing method, a user can access multiple OTT applications by using one piece of first user information, so that the user does not need to record first user information separately for each OTT application, so as to reduce complexity of accessing multiple OTT applications.

To resolve a problem existing in the prior art that a push manner and a push occasion are relatively undiversified when a server pushes a message, the embodiments of the present invention further provide three types of methods and apparatuses for pushing a message by a server. One type is: receiving a cross-OTT message push request that is sent by a server corresponding to a first OTT application, where the cross-OTT message push request is used by the server corresponding to the first OTT application to send a message to a user that does not access the first OTT application or does not register the first OTT application; and selecting, according to stored and acquired user information for registering an OTT application, a cross-OTT information receiving user that receives the message sent by the server corresponding to the first OTT application, and sending a message that is to be sent by the server corresponding to the first OTT application.

Another type is: receiving a cross-OTT message push request that is sent by a server corresponding to a first OTT application, where the cross-OTT message push request is used by the server corresponding to the first OTT application to send a message to a terminal that registers but does not access the first OTT application or does not register the first OTT application; and selecting, according to stored and acquired user information for registering an OTT application, a cross-OTT information receiving user that receives the message sent by the server corresponding to the first OTT application, and sending information about the selected cross-OTT information receiving user to the server corresponding to the first OTT application, so that the server corresponding to the first OTT application sends to-be-pushed information to the selected cross-OTT information receiving user. By using the message pushing method, a server can push a message to a terminal that registers but does not enable a related OTT application, and the server can also push a message to a terminal that does not register a corresponding OTT application, so that a terminal does not need to receive a message only if a related OTT application is enabled. Therefore, the problem existing in the prior art that a push manner and a push occasion are relatively undiversified when a server pushes a message is resolved.

Still another type is: acquiring, according to stored and acquired user information for accessing an OTT application, OTT information including at least user access information; and sending the acquired OTT information to a server corresponding to the first OTT application, so that the server corresponding to the first OTT application determines a cross-OTT information receiving user to which a message is to be pushed, and pushes the to-be-pushed message to the cross-OTT information receiving user. By using the message pushing method, a server can push a message to a terminal that registers but does not enable a related OTT application, and the server can also push a message to a terminal that does not register a corresponding OTT application, so that a terminal does not need to receive a message only if a related OTT application is enabled. Therefore, the problem existing in the prior art that a push manner and a push occasion are relatively undiversified when a server pushes a message is resolved.

In the following, preferred implementation manners of the present invention are described in detail with reference to the accompanying drawings.

Figure 1C:
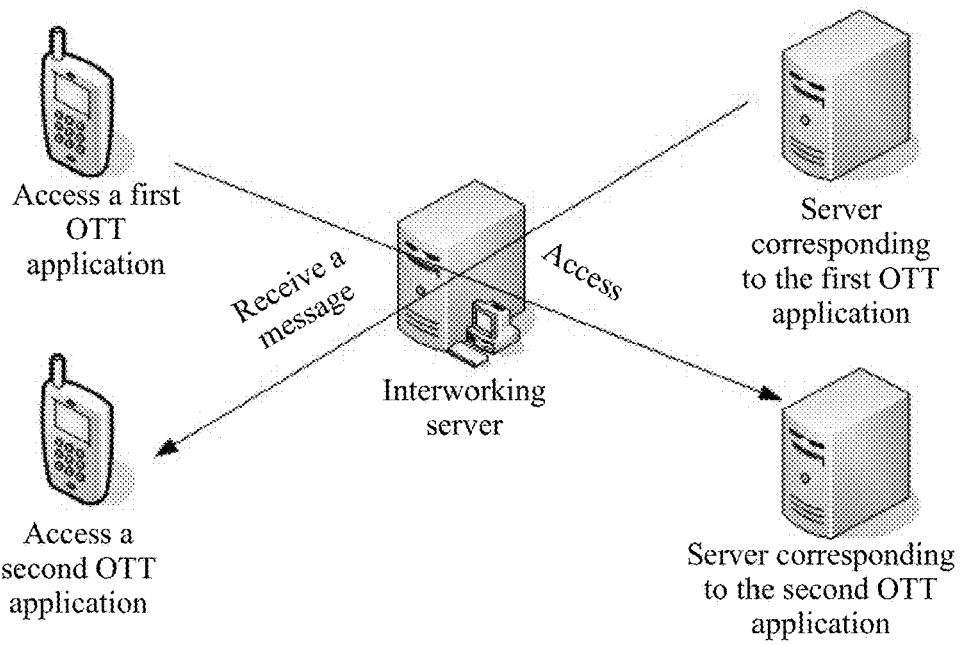
FIG. 1C is a schematic diagram of accessing multiple OTT applications by a terminal, and pushing a message by a server corresponding to an OTT application according to an embodiment of the present invention.

First, description is provided for how to access an unregistered OTT application by a terminal by using an interworking server, and then description is provided for how to receive, by a terminal by using an interworking server, a message sent by a server corresponding to an unregistered OTT application or a server corresponding to an OTT application that is registered but not enabled. As shown in FIG. 1C, before a user terminal accesses an OTT application, an interworking server first needs to store first user information of a user of an OTT application registered by the user terminal. Then, when the user terminal accesses an OTT application that is not registered by the user, the interworking server needs to authenticate user information provided by the user terminal, so as to determine whether the user is allowed to access the OTT application that is not registered by the user, and the OTT application that is not registered by the user accepts or rejects access of the user according to an authentication result.

In addition, when a server corresponding to an OTT application that is not accessed by a user needs to push a message (such as advertisement information) to the user, the interworking server needs to determine a cross-OTT information receiving user to which the message is to be pushed, and forward the to-be-pushed message to each cross-OTT information receiving user or a server accessed by the cross-OTT information receiving user.

Alternatively, the interworking server sends information (which includes at least account number information, and may further include user access status information) about a cross-OTT information receiving user to an OTT application server that pushes the message. The OTT application server sends the message to each cross-OTT information receiving user or a server accessed by each cross-OTT information receiving user, where the server further sends the message to each cross-OTT information receiving user.

Figure 2:
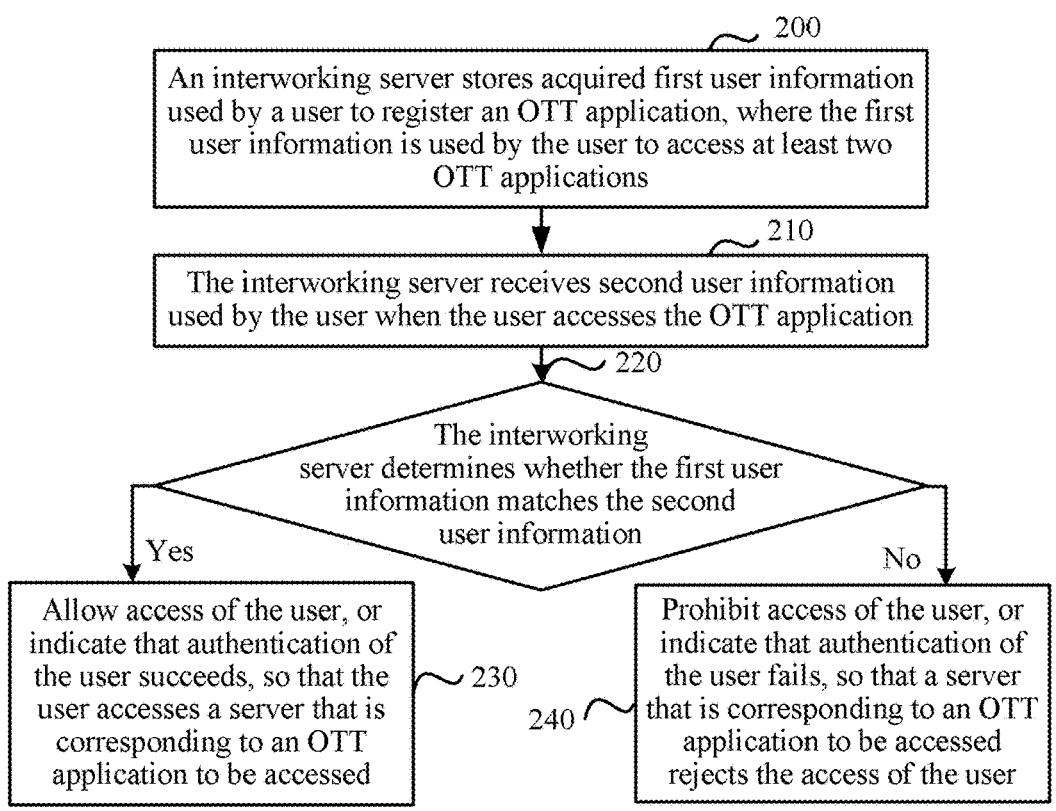
FIG. 2 is a detailed flowchart of accessing an OTT application according to an embodiment of the present invention.

Referring to FIG. 2, in an embodiment of the present invention, a detailed flowchart of accessing an OTT application is as follows:

Step 200: An interworking server stores acquired first user information used by a user to register an OTT application, where the first user information is used by the user to access at least two OTT applications.

Step 210: The interworking server receives second user information that is used by the user when the user accesses the OTT application.

Step 220: The interworking server determines whether the first user information matches the second user information; if the first user information matches the second user information, perform step 230, or if the first user information does not match the second user information, perform step 240.

Step 230: Allow access of the user, or indicate that authentication of the user succeeds, so that the user accesses a server that is corresponding to an OTT application to be accessed.

Step 240: Prohibit access of the user, or indicate that authentication of the user fails, so that a server that is corresponding to an OTT application to be accessed rejects the access of the user.

In this embodiment of the present invention, the first user information mainly refers to OTT application account information of the user, where the OTT application account information includes at least OTT application account number information. In addition, other information may be further included, for example, subscription intention of the user, mobile phone number information, email address information, or other contact information.

In this embodiment of the present invention, the first user information is acquired by the interworking server in multiple manners. For example, the user submits an OTT account registration application by using a server corresponding to an OTT application; then, the user sends the first user information to the interworking server after registration is completed, or a server corresponding to a successfully registered OTT application sends the first user information to the interworking server. For another example, when the user is registering an OTT account on the interworking server, the interworking server may directly acquire the first user information used by the user to register the OTT application. The first user information in the foregoing manners includes information input by the user, and/or information allocated by the interworking server after the user inputs other information.

Figure 3A:
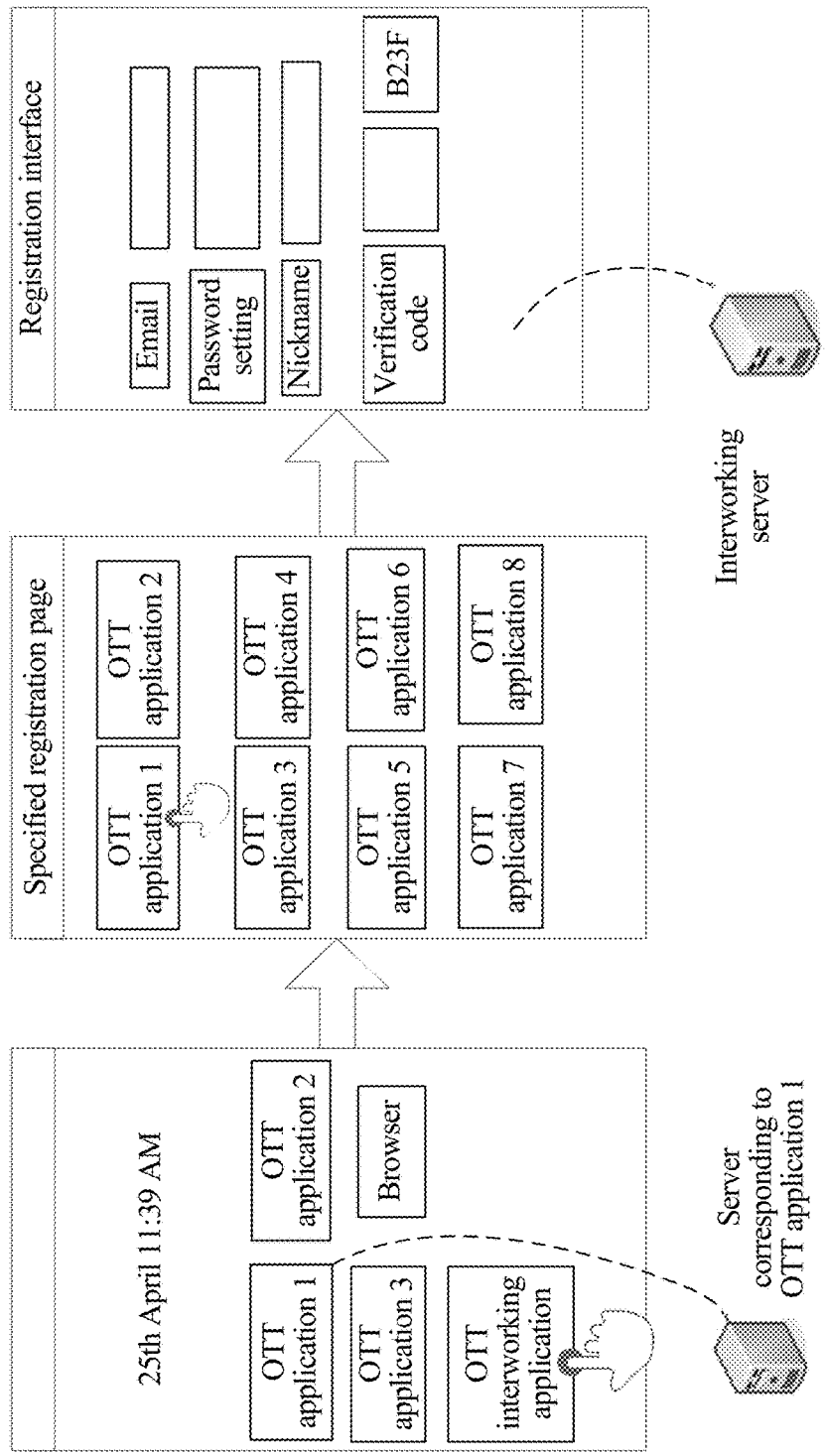
FIG. 3A is a first schematic diagram of registering an OTT application according to an embodiment of the present invention.
Figure 3B:
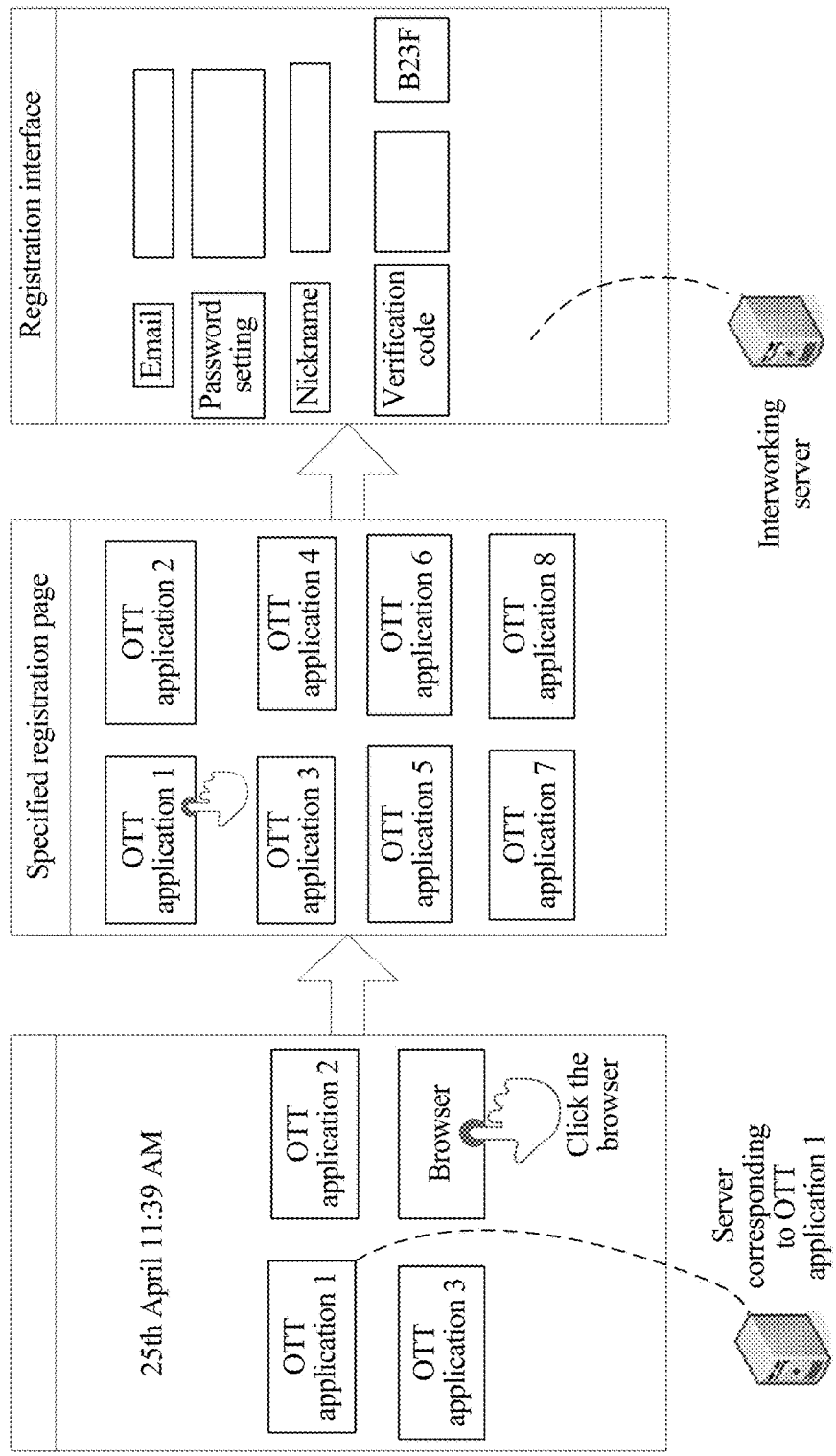
FIG. 3B is a second schematic diagram of registering an OTT application according to an embodiment of the present invention.
Figure 3C:
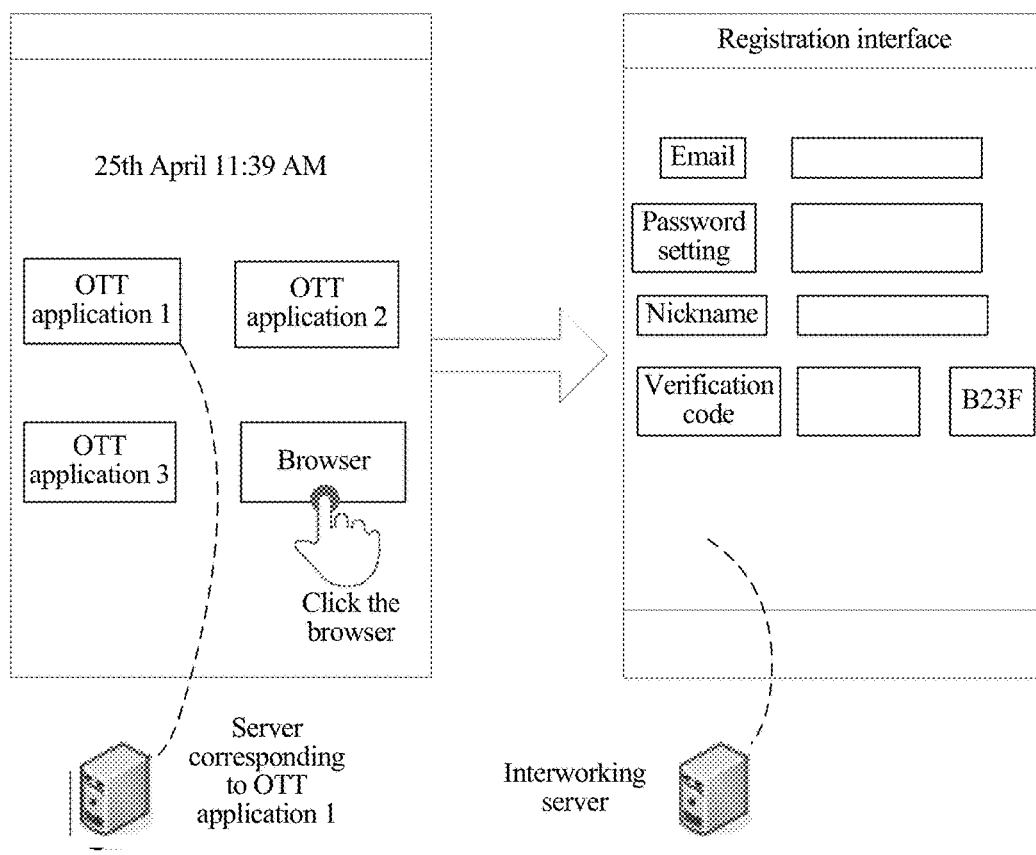
FIG. 3C is a third schematic diagram of registering an OTT application according to an embodiment of the present invention.
Figure 3D:
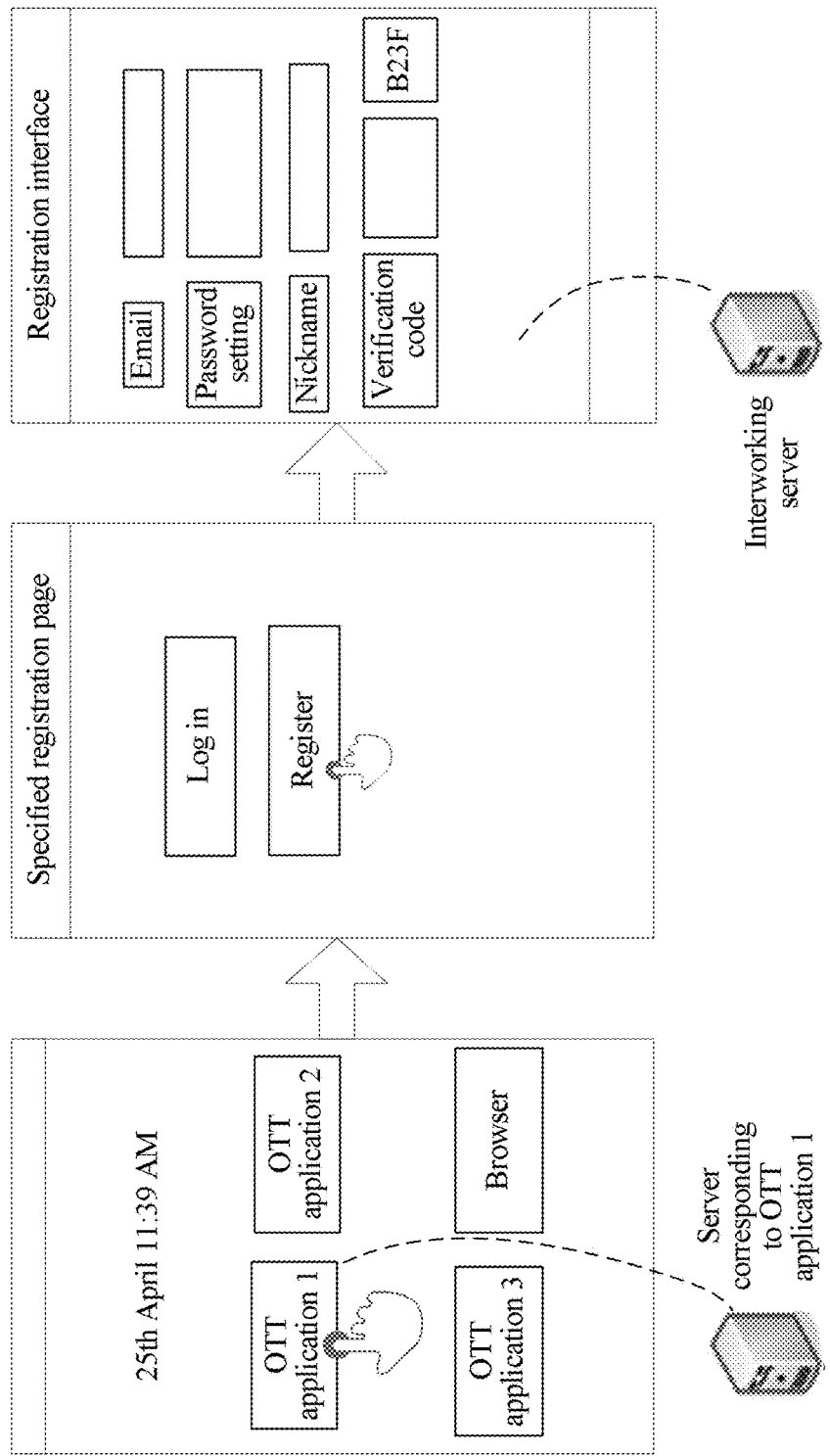
FIG. 3D is a fourth schematic diagram of registering an OTT application according to an embodiment of the present invention.

In the foregoing process, when the user is registering the OTT account on the interworking server, as shown in FIG. 3A, the user may directly enter a specified registration page by using a client corresponding to the interworking server, and then submit the OTT account registration application on the specified registration page. As shown in FIG. 3B, the user may also enter the specified registration page by using a browser client, and then submit the OTT account registration application on the specified registration page. As shown in FIG. 3C, the user may also enter the specified registration page by means of redirection to the interworking server by using a server corresponding to an OTT application to be registered, and then submit the OTT account registration application on the specified registration page. As shown in FIG. 3D, the user may also enter, by using the browser client, a selection interface for registering an OTT application, then select an OTT application on the selection interface for registering an OTT application, so as to enter a specified interface for registering the selected OTT application, and then submit the OTT account registration application on the specified interface.

Figure 3E:
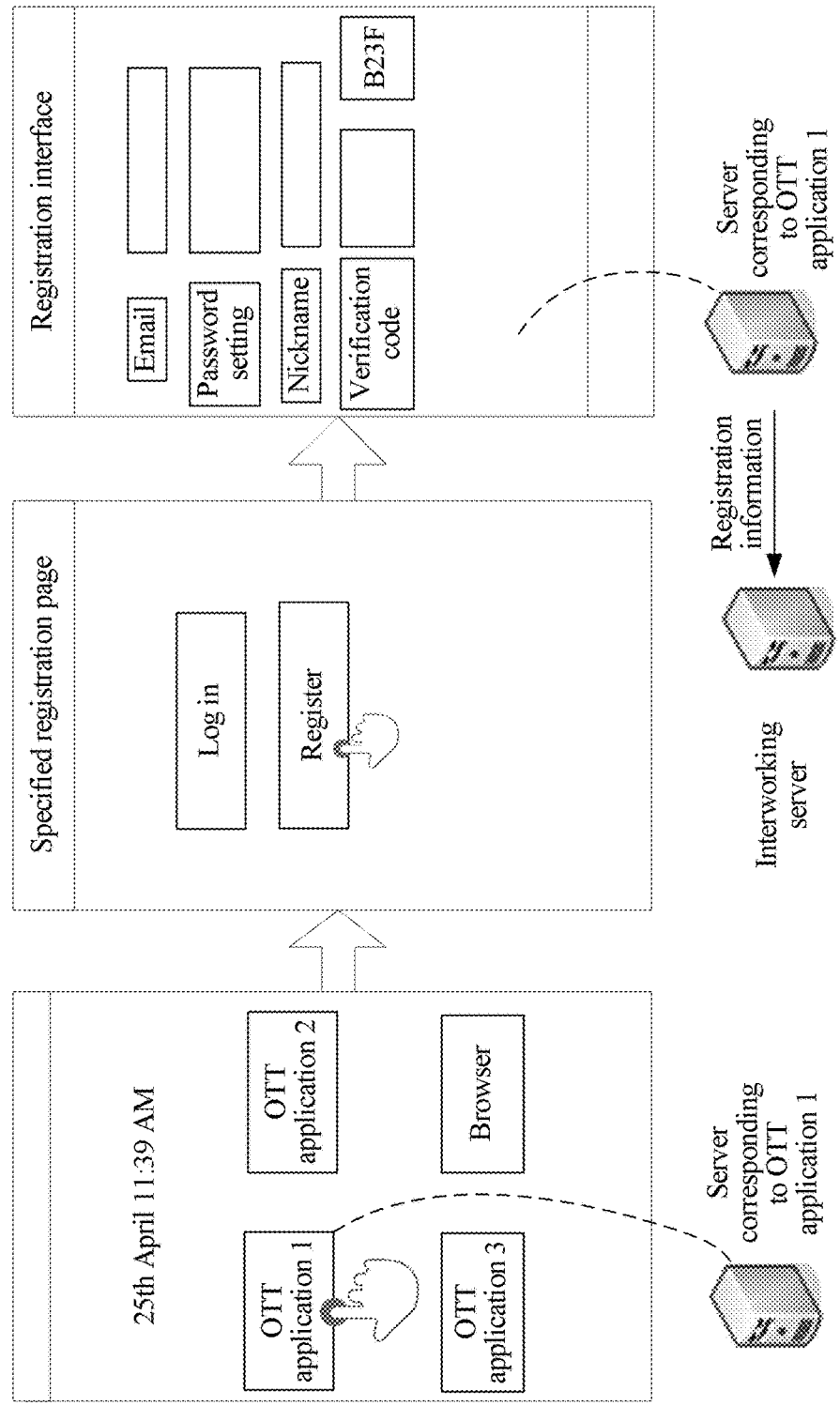
FIG. 3E is a fifth schematic diagram of registering an OTT application according to an embodiment of the present invention.

For another example, as shown in FIG. 3E, the user submits the registration application by using a server corresponding to an OTT application, and after registration is completed, the user notifies the interworking server of the first user information, or the server corresponding to the registered OTT application notifies the interworking server of the first user information.

To improve security of the first user information, in this embodiment of the present invention, after registering the OTT application, the user may further set password information corresponding to the first user information.

Figure 3F:
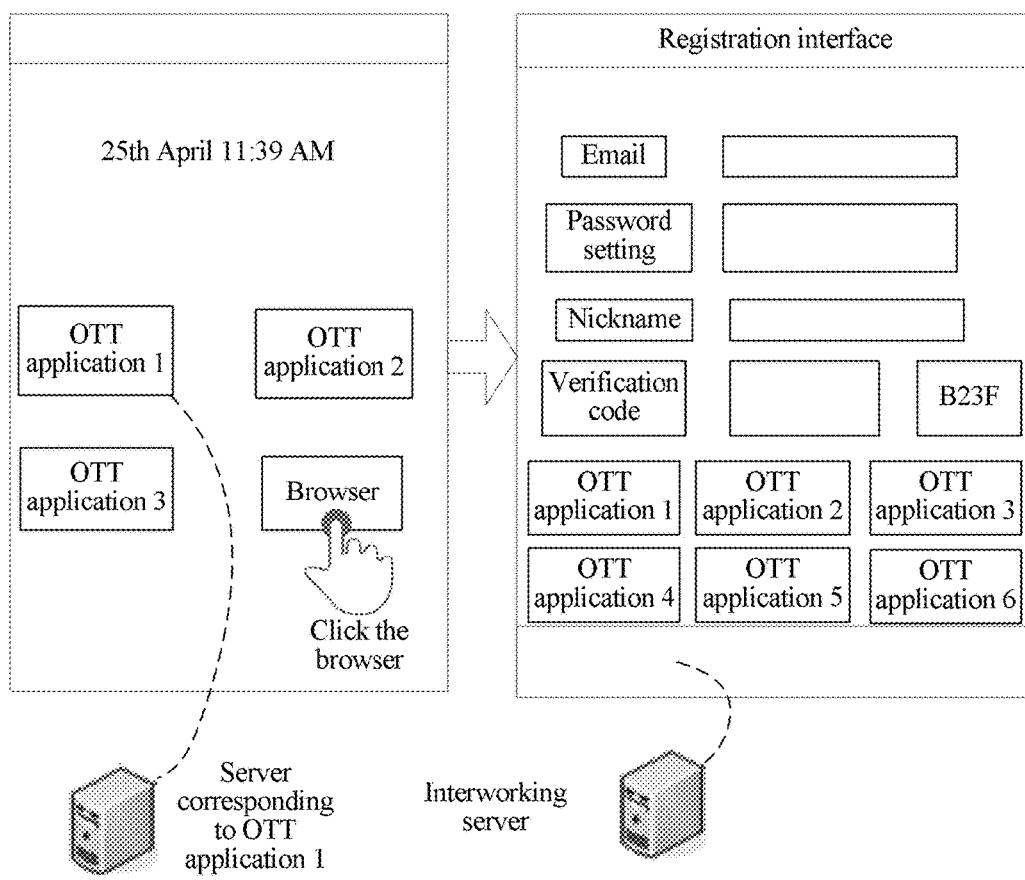
FIG. 3F is a schematic diagram of setting first user information and a corresponding OTT application according to an embodiment of the present invention.

In this embodiment of the present invention, the first user information is set to be capable of being used to access more than two OTT applications, which may be set according to the user or by default. When the first user information is set according to the user, a specified registration interface may be entered by using a browser, and a list of names of OTT that may be selected by the user and that may share the first user information is provided on the registration interface. As shown in FIG. 3F, the user may select, after inputting related registration information and before acquiring the first user information allocated by the server, another OTT application that may share the first user information. The foregoing is only a specific embodiment; in an actual application, the setting may be performed in multiple manners, and details are not described herein again.

In this embodiment of the present invention, the interworking server receives, in multiple manners, second user information that is used by the user when the user accesses an OTT application. Optionally, for example, when the user accesses a second OTT application directly by using a client of the interworking server, the interworking server directly receives the second user information provided by a user client, and then performs authentication.

For another example, when the user accesses an OTT application by using a server corresponding to the OTT application, the server corresponding to the OTT application sends, to the interworking server, the second user information that is sent by a user side, and the interworking server receives the second user information that is sent by the server corresponding to the OTT application, and then performs authentication.

For still another example, when accessing an OTT application by using an OTT application client, the user is directly redirected to an OTT interworking server; then, the interworking server directly receives the second user information provided by a user client, and then performs authentication.

In this embodiment of the present invention, the interworking server determines whether the first user information matches the second user information in multiple manners. For example, a manner of determining whether the first user information is consistent with the second user information may be used to determine whether the first user information matches the second user information; or a key encryption manner may be used to determine whether the first user information matches the second user information. In an actual application, the determining may be performed in many other manners, and details are not described herein again.

In this embodiment of the present invention, the determining, by the interworking server, whether the first user information matches the second user information is actually authenticating and determining authenticity of the second user information according to the first user information; and whether the user is allowed to access the OTT application is further determined. To determine, according to the second user information, whether the user is allowed to access an OTT application, the interworking server mainly performs the following operations:

First, authenticity of a user identity is determined according to the acquired second user information, that is, an authenticity authentication function is performed. The interworking server authenticates user authenticity in multiple manners, such as a manner based on a user name/password or 3GPP (3rd Generation Partnership Project) GAA (generic authentication architecture).

Because different OTT applications have different security requirements for user information of a user, the interworking server may perform security classification on the first user information of the user according to cases, so as to provide a more reliable platform to an OTT application. That is, to further improve security, in this embodiment of the present invention, after the authenticity of the user identity is determined, user access permission is further determined according to the second user information. The interworking server acquires user information in different manners. For example, for some OTT applications of higher security, checking is performed on some information when the user performs registration; therefore, the user information is relatively secure. However, for some other OTT applications, checking is not performed on information filled by the user during registration, therefore, security of the user information is relatively low. Therefore, the user access permission needs to be determined, where a manner of determining the access permission may be: determining whether a security level of the user information is greater than a preset security level threshold.

Figure 4A:
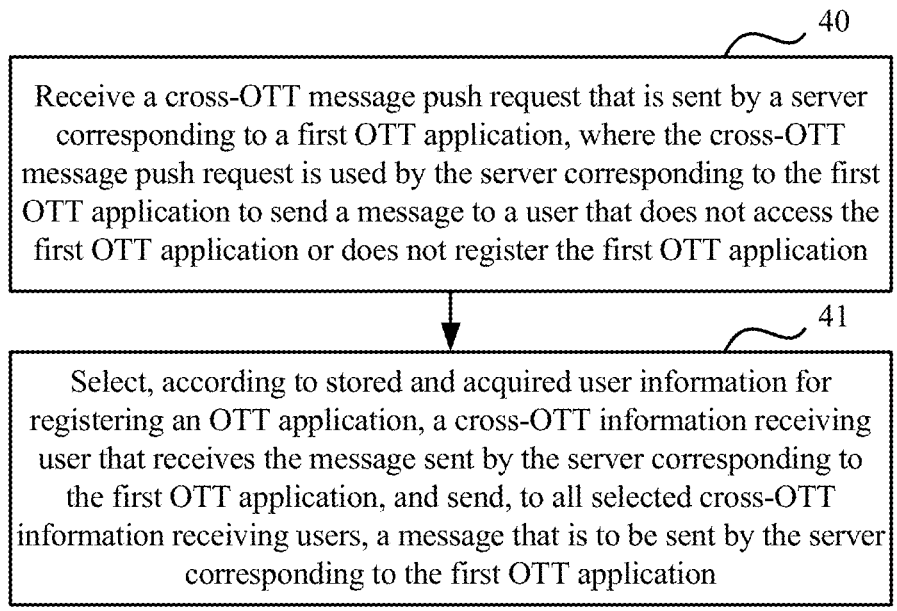
FIG. 4A is a first detailed flowchart of pushing a message by a server corresponding to an OTT application according to an embodiment of the present invention.

In the embodiments of the present invention, three methods for pushing a message by a server corresponding to an OTT application are provided, and one of the three methods is specifically as follows:

Referring to FIG. 4A, in an embodiment of the present invention, a first detailed flowchart of pushing a message by a server corresponding to an OTT application is as follows:

Step 40: Receive a cross-OTT message push request that is sent by a server corresponding to a first OTT application, where the cross-OTT message push request is used by the server corresponding to the first OTT application to send a message to a terminal that does not access the first OTT application or does not register the first OTT application.

Step 41: Select, according to stored and acquired user information for registering an OTT application, a cross-OTT information receiving user that receives the message sent by the server corresponding to the first OTT application, and send a message that is to be sent by the server corresponding to the first OTT application.

In this embodiment of the present invention, in step 41, the message that is to be sent by the server corresponding to the first OTT application is sent to all selected cross-OTT information receiving users in multiple manners. For example, the received message that is sent by the server corresponding to the first OTT application is directly delivered to the cross-OTT information receiving user without using an OTT application server currently accessed by the cross-OTT information receiving user. The received message that is sent by the server corresponding to the first OTT application may also be sent to a server corresponding to a second OTT application that is accessed by the cross-OTT information receiving user, and then the message is sent to the cross-OTT information receiving user by the server corresponding to the second OTT application that is accessed by the cross-OTT information receiving user.

Figure 4B:
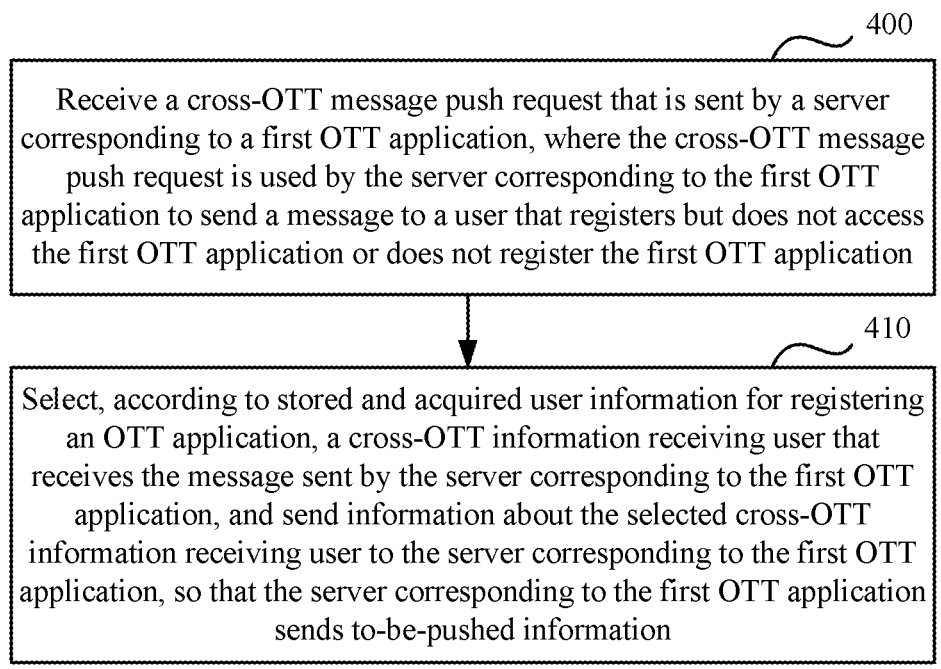
FIG. 4B is a second detailed flowchart of pushing a message by a server corresponding to an OTT application according to an embodiment of the present invention.

Referring to FIG. 4B, in an embodiment of the present invention, a second detailed flowchart of pushing a message by a server corresponding to an OTT application is as follows:

Step 400: Receive a cross-OTT message push request that is sent by a server corresponding to a first OTT application, where the cross-OTT message push request is used by the server corresponding to the first OTT application to send a message to a terminal that registers but does not access the first OTT application or does not register the first OTT application.

Step 410: Select, according to stored and acquired user information for registering an OTT application, a cross-OTT information receiving user that receives the message sent by the server corresponding to the first OTT application, and send information about the selected cross-OTT information receiving user to the server corresponding to the first OTT application, so that the server corresponding to the first OTT application sends to-be-pushed information to the selected cross-OTT information receiving user.

In the solution shown in FIG. 4B, the server corresponding to the first OTT application may not send a to-be-sent message to the interworking server, but first send the cross-OTT message push request to the interworking server, where the request is used by the server corresponding to the first OTT application to send the message to the terminal that registers but does not access the first OTT application or does not register the first OTT application. After receiving the request, the interworking server determines which users may receive the to-be-pushed message, considers these users as cross-OTT information receiving users, and knows a server currently accessed by these users. The interworking server is responsible for establishing a mutual trust connection between the server corresponding to the first OTT application and a server currently accessed by the cross OTT information receiving user. After the connection is established, the server corresponding to the first OTT application directly delivers the message that needs to be pushed and a list of receiving user names to the server currently accessed by the cross OTT information receiving user, and the server currently accessed by the cross OTT information receiving user pushes the message to a client of the cross-OTT information receiving user.

Figure 4C:
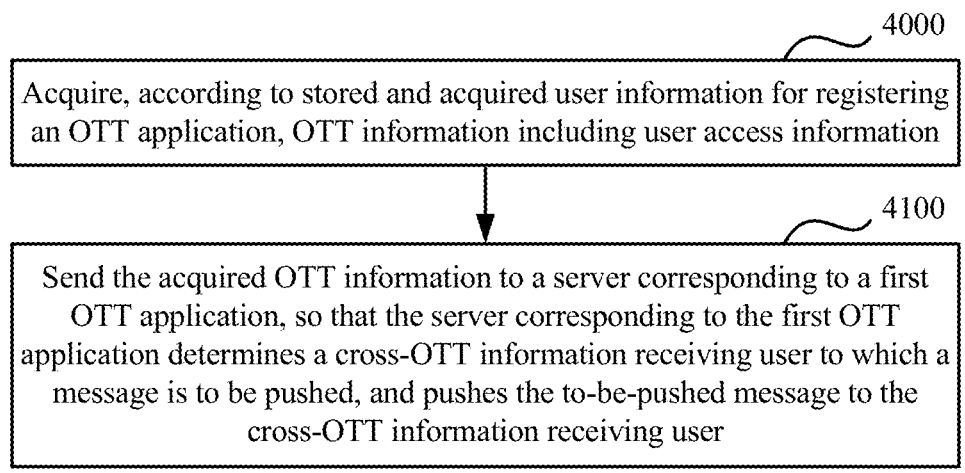
FIG. 4C is a third detailed flowchart of pushing a message by a server corresponding to an OTT application according to an embodiment of the present invention.

Referring to FIG. 4C, in an embodiment of the present invention, a third detailed flowchart of pushing a message by a server corresponding to an OTT application is as follows:

Step 4000: Acquire, according to stored and acquired user information for registering an OTT application, OTT information including user access information.

Step 4100: Send the acquired OTT information to a server corresponding to a first OTT application, so that the server corresponding to the first OTT application determines a cross-OTT information receiving user to which a message is to be pushed, and pushes the to-be-pushed message to the cross-OTT information receiving user.

In this embodiment, the OTT information further includes: intention information of a user, where the intention information of the user carries at least a type of information that the user intends to receive.

In the foregoing three manners, before steps 40, 400, and 4000, the interworking server needs to acquire and store access information of each user (including whether the user is online, which server is currently accessed, and the like), where there are multiple specific manners for acquiring access information of the cross-OTT information receiving user.

For example, manner (1): A user accesses a second OTT application by using a client corresponding to the second OTT application, where for a specific access manner, refer to steps 200 to 240. The interworking server may acquire access information of the user directly from an access process; or a server corresponding to the second OTT application notifies the interworking server of access information of the user after the user completes access to the second OTT application.

For another example, manner (2): The cross-OTT information receiving user directly accesses the interworking server by using a client corresponding to the interworking server, so that the interworking server may directly acquire the access information from an access process.

After acquiring the access information of the cross-OTT information receiving user, the interworking server may send the access information of the cross-OTT information receiving user to the server corresponding to the first OTT application, or may not send the access information of the cross-OTT information receiving user to the server corresponding to the first OTT application, where the access information includes at least a user account and a user online or offline state, and may further include a user nickname, an address and a domain name of the server corresponding to the first OTT application, and the like.

Further, to prevent the user from receiving lots of junk information that the user is not interested in, corresponding to steps 41, 410, and 4100, specific screening and limitation need to be made on a range of the cross-OTT information receiving user selected by the server corresponding to the first OTT application. Specifically, possible manners are as follows:

Manner 1: User online information that can be acquired by the interworking server may be limited to online information of all users that register account numbers on the server corresponding to the first OTT application.

Manner 2: An interworking server provider (such as an operator) acquires intention information of a user. Content of the intention information may be whether allowing an online state of the user on an OTT application to be notified to a server corresponding to another OTT application that stores user information on the interworking server, or whether willing to receive a type of message (such as a game recommendation message or an advertisement message for fashion and shopping) or a call request sent by a server corresponding to another OTT application that stores user information on the interworking server, or whether willing to receive a message pushed by a server corresponding to a type of OTT application, or a specific OTT application name list. In addition, the interworking server may further acquire an attribute (such as a grade, a job type, or interests) of the user. The interworking server may screen, according to related information, an OTT application that may acquire online information of the user.

It is worth pointing out that there are multiple manners for the user and the interworking server to acquire intention information of a cross-OTT information receiving user.

For example, manner (a): A specific manner for acquiring the intention information may be that a corresponding option is provided on a registration page of a new user for the user to perform selection. When registering user information corresponding to a new OTT application, the user selects a type and a resource of a message that the user is willing to receive, and the like. The intention information may also be provided in a service manner. For example, the user subscribes a related service by means of a business office, a short message, or a manual telephone, and the interworking server stores the intention information of the user.

For another example, manner (b): If user information of a user is not registered by using the interworking server, but is registered on a server corresponding to an OTT application, the user may notify the interworking server of intention information and user attribute information in a manner similar to manner 2, and then the interworking server acquires corresponding information from the server corresponding to the OTT application. Afterward, the interworking server stores the intention information of the user.

For example, when selecting a terminal user that may receive pushed information, the interworking server may perform screening according to an acquired type of information that the user determines to receive, where the type of the information that the user determines to receive may include a specific type of a message received by the user, such as a type of a game recommendation message and a type of an advertisement message for fashion and shopping; or may indicate a corresponding OTT type; or specify a sent message of which OTT application the user is willing to receive, and provide an OTT name.

In the embodiment shown in FIG. 4B, the interworking server may send the user access information and the intention information of the user to the server corresponding to the first OTT application. The server corresponding to the first OTT application determines to send a message (and even establish a call connection) to which cross-OTT target user, that is, determines the cross-OTT information receiving user. In this manner, when sending a message to a target user, namely, the cross-OTT information receiving user, the server corresponding to the first OTT application may select to deliver the message that is to be sent to the cross-OTT information receiving user to the interworking server, and then the interworking server sends the message to the cross-OTT information receiving user; or the server corresponding to the first OTT application may directly send the message that is to be sent to the cross-OTT information receiving user to the interworking server; then the interworking server sends the message to a server currently accessed by the cross-OTT information receiving user, and then the server currently accessed by the cross-OTT information receiving user sends the message to the cross-OTT information receiving user.

In the manner shown in FIG. 4A, when pushing a message to the cross-OTT information receiving user, the server corresponding to the first OTT application may also select to directly send, to a server currently accessed by the cross OTT information receiving user, the message that needs to be pushed. Therefore, before sending the message, the server corresponding to the first OTT application notifies the interworking server of intention of sending the message, and then the interworking server is responsible for establishing a mutual trust connection between the server corresponding to the first OTT application and the server currently accessed by the cross OTT information receiving user. After the connection is established, the server corresponding to the first OTT application directly delivers, to the server currently accessed by the cross-OTT information receiving user, the message that needs to be sent, and then the server currently accessed by the cross-OTT information receiving user forwards the message to the cross-OTT information receiving user. There are multiple manner for the interworking server to establish the mutual trust connection between the server corresponding to the first OTT application and the server currently accessed by the cross OTT information receiving user. Optionally, the interworking server issues a credential to the server corresponding to the first OTT application; after obtaining the credential, the server corresponding to the first OTT application establishes a connection to the server currently accessed by the target user.

To better understand this embodiment of the present invention, the following provides a specific application scenario, and detailed description is further provided for a process in which a server pushes a message (the interworking server is a server A, the server corresponding to the first OTT application is a server B, and the server corresponding to the second OTT application is a server C).

Embodiment 1

Figure 5:
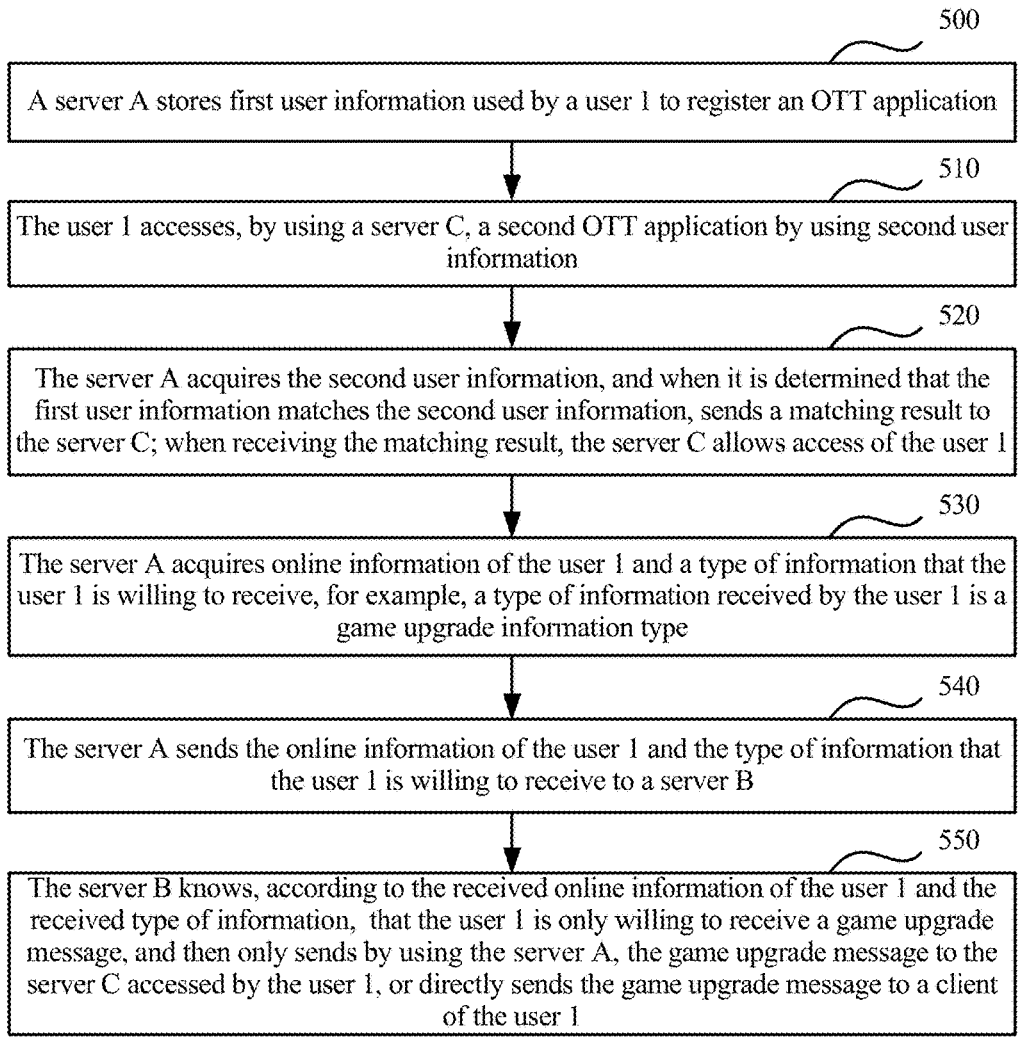
FIG. 5 is a first embodiment of pushing a message by a server corresponding to an OTT application according to an embodiment of the present invention.

Details are shown in FIG. 5 (the server A sends, to the server B, access information that is used by a user 1 to access the second OTT application).

Step 500: The server A stores first user information used by the user 1 to register an OTT application.

In this step, the first user information is used by the user 1 to access at least two OTT applications.

Step 510: The user 1 accesses, by using the server C, the second OTT application by using second user information.

In this step, the user 1 may access the second OTT application by using the server C, or may access the second OTT application by using the server A, where when the user 1 accesses the second OTT application by using the server C, the server C needs to send the second user information of the user 1 to the server A, and the second user information includes at least user account number information and online/offline information, and may further include an address and/or a domain name of the server C.

Step 520: The server A acquires the second user information, and when it is determined that the first user information matches the second user information, sends a matching result to the server C; when receiving the matching result, the server C allows access of the user 1.

Step 530: The server A acquires online information of the user 1 and a type of information that the user 1 is willing to receive, for example, a type of information that is received by the user 1 is a game upgrade information type.

When acquiring the type of information that is received by the user 1, the server A may provide, on a page on which the user 1 registers an OTT application, a corresponding information receive option for the user 1 to perform selection, and then use to-be-received information clicked by the user 1 as the type of information that is received by the user 1.

Step 540: The server A sends the online information of the user 1 and the type of information that the user 1 is willing to receive to the server B.

Step 550: The server B knows, according to the received online information of the user 1 and the received type of information, that the user 1 is only willing to receive a game upgrade message, and then only sends by using the server A, the game upgrade message to the server C accessed by the user 1, or directly sends the game upgrade message to a client of the user 1.

Embodiment 2

Figure 6:
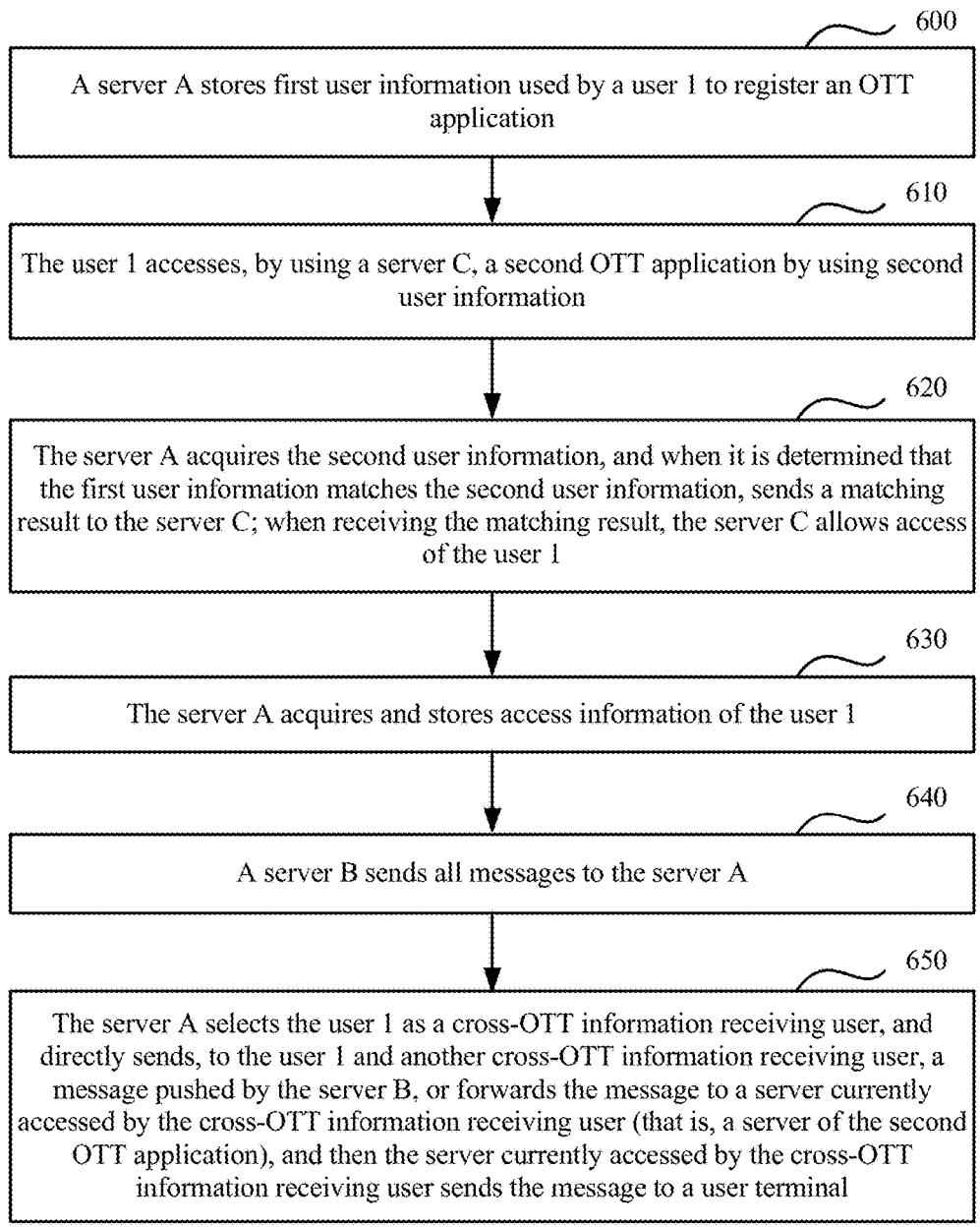
FIG. 6 is a second embodiment of pushing a message by a server corresponding to an OTT application according to an embodiment of the present invention.

Details are shown in FIG. 6 (the server A does not send second user information of a user 1 for accessing the second OTT application to the server B).

Step 600: The server A stores first user information used by the user 1 to register an OTT application.

In this step, the first user information is used by the user 1 to access at least two OTT applications.

Step 610: The user 1 accesses, by using the server C, the second OTT application by using second user information.

In this step, the user 1 may access the second OTT application by using the server C, or may access the second OTT application by using the server A, where when the user 1 accesses the second OTT application by using the server C, the server C needs to send the second user information of the user 1 to the server A, and the second user information includes at least user account number information and online/offline information, and may further include an address and/or a domain name of the server C.

Step 620: The server A acquires the second user information, and when it is determined that the first user information matches the second user information, sends a matching result to the server C; when receiving the matching result, the server C allows access of the user 1.

Step 630: The server A acquires and stores access information of the user 1.

Step 640: The server B sends all messages to the server A.

Step 650: The server A selects the user 1 as a cross-OTT information receiving user, and directly sends, to the user 1 and another cross-OTT information receiving user, a message pushed by the server B, or forwards the message to a server currently accessed by the cross-OTT information receiving user (that is, the server corresponding to the second OTT application), and then the server currently accessed by the cross-OTT information receiving user sends the message to a user terminal.

A specific manner in which the server A selects a cross-OTT information receiving user to which the server B pushes a message is as follows:

For example, information about all users that are currently in an online state is acquired. For another example, according to information about a user that is in an online state, intention information (that is, a type of a message the user is willing to receive) of the user is known.

A user that is willing to receive a message of the server B is found according to intention information of each user, and the user that is willing to receive the message of the server B is determined as a cross-OTT information receiving user.

Figure 7:
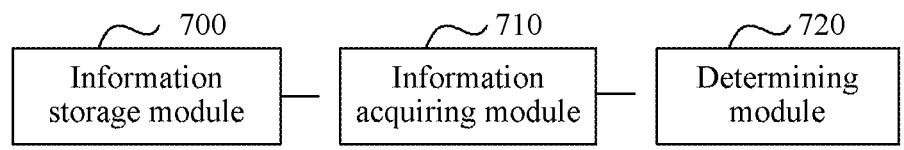
FIG. 7 is a first schematic diagram of an interworking server according to an embodiment of the present invention.

Referring to FIG. 7, an embodiment of the present invention provides an interworking server, and the interworking server mainly includes:

an information storage module 700, configured to store acquired first user information used by a user to register an OTT application, where the first user information is used by the user to access at least two OTT applications;

an information acquiring module 710, configured to receive second user information that is used by the user when the user accesses the OTT application; and a determining module 720, configured to determine whether the first user information matches the second user information, and if the first user information matches the second user information, allow access of the user, or indicate that authentication of the user succeeds, so that the user accesses a server that is corresponding to an OTT application to be accessed; or if the first user information does not match the second user information, prohibit access of the user, or indicate that authentication of the user fails, so that a server that is corresponding to an OTT application to be accessed rejects the access of the user.

In this embodiment of the present invention, optionally, the information storage module 700 is specifically configured to:

if the user registers an OTT account by using the interworking server, directly acquire and store the first user information; or if the user registers an OTT account by using a server corresponding to the OTT application, acquire the first user information by using the user, or acquire the first user information by using the server corresponding to the OTT application, and store the first user information.

Further, in this embodiment of the present invention, the information storage module 700 is further configured to:

after receiving the first user information that is used by the user to register the OTT application, and before storing the first user information, receive a password corresponding to the first user information.

In this embodiment of the present invention, optionally, the information acquiring module 710 is specifically configured to:

receive, by using a client corresponding to the server, second user information provided by the client when the user accesses the OTT application; or acquire, by using a request that is redirected to the server by the server that is corresponding to the OTT application to be accessed, second user information that is provided when the user accesses a second OTT application; or receive second user information sent by the server that is corresponding to the OTT application to be accessed, where when the user accesses a second OTT application, the second user information is provided to the server corresponding to the OTT application.

Further, in this embodiment of the present invention, the determining module 720 is further configured to:

after it is determined that the second user information is the first user information stored by the server, and when it is determined that a security level of the second user information reaches a preset security level threshold, allow the access of the user, or indicate that the authentication of the user succeeds, so that the user accesses the server that is corresponding to the OTT application to be accessed.

Figure 8:
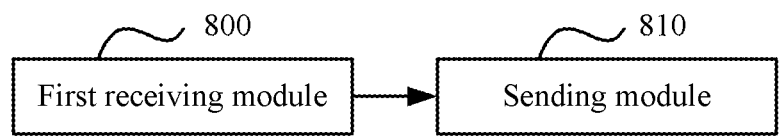
FIG. 8 is a second schematic diagram of an interworking server according to an embodiment of the present invention.

Referring to FIG. 8, an embodiment of the present invention provides an interworking server, and the interworking server mainly includes:

a first receiving module 800, configured to receive a cross-OTT message push request that is sent by a server corresponding to a first OTT application, where the cross-OTT message push request is used by the server corresponding to the first OTT application to send a message to a user that does not access the first OTT application or does not register the first OTT application; and a sending module 810, configured to select, according to stored and acquired user information for registering an OTT application, a cross-OTT information receiving user that receives the message sent by the server corresponding to the first OTT application, and send a message that is to be sent by the server corresponding to the first OTT application.

In this embodiment of the present invention, optionally, the sending module 810 is specifically configured to:

acquire intention information of a user corresponding to the stored user information, and obtain, according to the intention information of the user, a type of information that the user intends to receive; and select a user whose type of information that the user intends to receive matches a type of a message pushed by the first OTT application, as a cross-OTT information receiving user of the message that is to be sent by the server corresponding to the first OTT application.

In this embodiment of the present invention, optionally, the sending module 810 is specifically configured to:

for each determined cross-OTT information receiving user, send, by using a server accessed by the cross-OTT information receiving user, the received message that is sent by the server corresponding to the first OTT application, or directly send the received message that is sent by the server corresponding to the first OTT application.

Further, in this embodiment of the present invention, the sending module 810 is further configured to:

for each determined cross-OTT information receiving user, after the received message that is sent by the server corresponding to the first OTT application is acquired, and before the received message is sent to the cross-OTT information receiving user by using the server accessed by the cross-OTT information receiving user, store acquired access information of the cross-OTT information receiving user.

In this embodiment of the present invention, optionally, the sending module 810 is specifically configured to:

if the cross-OTT information receiving user accesses another server, receive access information that is sent by the server accessed by the cross-OTT information receiving user; or if the cross-OTT information receiving user accesses the server, acquire the access information of the cross-OTT information receiving user directly from the server.

Figure 9:
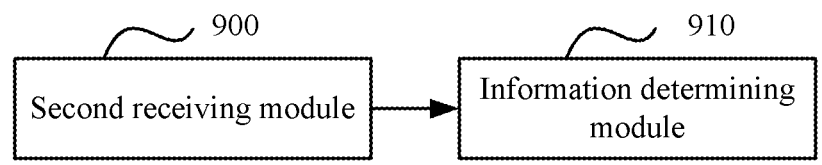
FIG. 9 is a third schematic diagram of an interworking server according to an embodiment of the present invention.

Referring to FIG. 9, an embodiment of the present invention provides an interworking server, and the interworking server mainly includes:

a second receiving module 900, configured to receive a cross-OTT message push request that is sent by a server corresponding to a first OTT application, where the cross-OTT message push request is used by the server corresponding to the first OTT application to send a message to a user that registers but does not access the first OTT application or does not register the first OTT application; and an information determining module 910, configured to select, according to stored and acquired user information for registering the OTT application, a cross-OTT information receiving user that receives the message sent by the server corresponding to the first OTT application, and send information about the selected cross-OTT information receiving user to the server corresponding to the first OTT application, so that the server corresponding to the first OTT application sends to-be-pushed information to the selected cross-OTT information receiving user.

Figure 10:
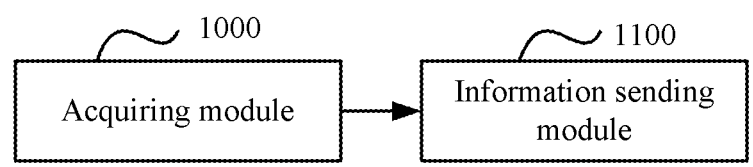
FIG. 10 is a fourth schematic diagram of an interworking server according to an embodiment of the present invention.

Referring to FIG. 10, an embodiment of the present invention provides an interworking server, and the interworking server mainly includes:

an acquiring module 1000, configured to acquire, according to stored and acquired user information for accessing an OTT application, OTT information including at least user access information; and an information sending module 1100, configured to send the acquired OTT information to a server corresponding to a first OTT application, so that the server corresponding to the first OTT application determines a cross-OTT information receiving user to which a message is to be pushed, and pushes the to-be-pushed message to the cross-OTT information receiving user.

In this embodiment of the present invention, the OTT information acquired by the acquiring module 1000 further includes: intention information of a user, where the intention information of the user carries at least a type of information that the user intends to receive.

In conclusion, in the embodiments of the present invention, a method and an apparatus for accessing an OTT application are disclosed. By using the accessing method, a user can access multiple OTT applications by using one piece of first user information, so that the user does not need to record first user information separately for each OTT application, so as to reduce complexity of accessing multiple OTT applications. Three types of methods and apparatuses for pushing a message by a server are further provided. By using the message pushing methods, a server can push a message to a terminal that registers but does not enable a related OTT application, and the server can also push a message to a terminal that does not register a corresponding OTT application, so that a terminal does not need to receive the message only if a related OTT application is enabled. Therefore, a problem existing in the prior art that a push manner and a push occasion are relatively undiversified when a server pushes a message is resolved.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

Although the foregoing embodiments of the present invention have been described, a person skilled in the art can make changes and modifications to these embodiments once they learn the basic inventive concept. Therefore, the following claims are intended to be construed as to cover the foregoing embodiments and all changes and modifications falling within the scope of the present invention.

Obviously, a person skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. An interworking server, comprising:
a memory; and
a hardware processor coupled to the memory and configured to:
receive a cross-over-the-top (OTT) message push request that is sent by a server corresponding to a first OTT application, wherein the cross-OTT message push request is used by the server corresponding to the first OTT application to send a message to a user that has not accessed the first OTT application;
select, according to stored and acquired user information for registering the OTT application, a cross-OTT information receiving user that receives the message sent by the server corresponding to the first OTT application, and send a message that is to be sent by the server corresponding to the first OTT application;
acquire intention information of the user corresponding to the stored user information;
obtain a type of information that the user intends to receive according to the intention information of the user; and
select the user whose type of information that the user intends to receive matches a type of a message pushed by the first OTT application as a cross-OTT information receiving user of the message that is to be sent by the server corresponding to the first OTT application.

2. The interworking server according to claim 1, wherein the processor is further configured to:
for each determined cross-OTT information receiving user, send, by using a server accessed by the cross-OTT information receiving user, the received message that is sent by the server corresponding to the first OTT application, or directly send the received message that is sent by the server corresponding to the first OTT application.

3. The interworking server according to claim 2, wherein the processor is further configured to:
for each determined cross-OTT information receiving user, after the received message that is sent by the server corresponding to the first OTT application is acquired, and before the received message is sent to the cross-OTT information receiving user by using the server accessed by the cross-OTT information receiving user, store acquired access information of the cross-OTT information receiving user.

4. The interworking server according to claim 3, wherein the processor is further configured to:
if the cross-OTT information receiving user accesses another server, receive access information that is sent by the server accessed by the cross-OTT information receiving user; or
if the cross-OTT information receiving user accesses the server, acquire the access information of the cross-OTT information receiving user directly from the server.

5. An interworking server, comprising:
a memory; and
a hardware processor coupled to the memory and configured to:
receive a cross-over-the-top (OTT) message push request that is sent by a server corresponding to a first OTT application, wherein the cross-OTT message push request is used by the server corresponding to the first OTT application to send a message to a user that registers but has not accessed the first OTT application;
select a cross-OTT information receiving user that receives the message sent by the server corresponding to the first OTT application according to stored and acquired user information for registering the OTT application;
acquire intention information of the user corresponding to the stored user information;
obtain a type of information that the user intends to receive according to the intention information of the user; and select the user whose type of information that the user intends to receive matches a type of a message pushed by the first OTT application as a cross-OTT information receiving user of the message that is to be sent by the server corresponding to the first OTT application; and send information about the selected cross-OTT information receiving user to the server corresponding to the first OTT application so that the server corresponding to the first OTT application sends to-be-pushed information to the selected cross-OTT information receiving user.

6. An interworking server, comprising:

a memory; and a hardware processor coupled to the memory and configured to:

acquire over-the-top (OTT) information including at least user access information according to stored and acquired user information for accessing an OTT application;

acquire intention information of a user corresponding to the stored user information;

obtain a type of information that the user intends to receive according to the intention information of the user; and select the user whose type of information that the user intends to receive matches a type of a message pushed by the first OTT application as a cross-OTT information receiving user of the message that is to be sent by the server corresponding to the first OTT application; and send the acquired OTT information to a server corresponding to a first OTT application, so that the server corresponding to the first OTT application determines a cross-OTT information receiving user to which a message is to be pushed, and pushes the to-be-pushed message to the cross-OTT information receiving user.

7. The interworking server according to claim 6, wherein the OTT information acquired by the processor further includes: intention information of the user, and wherein the intention information of the user carries at least a type of information that the user intends to receive.

8. A method for pushing a message by a server corresponding to an over-the-top (OTT) application, comprising:

receiving a cross-OTT message push request sent by a server corresponding to a first OTT application, wherein the cross-OTT message push request is used by the server corresponding to the first OTT application to send a message to a user that has not accessed the first OTT application;

selecting a cross-OTT information receiving user that receives the message sent by the server corresponding to the first OTT application according to stored and acquired user information for registering an OTT application;

acquiring intention information of the user corresponding to the stored user information, and obtaining a type of information that the user intends to receive according to the intention information of the user;

selecting the user whose type of information that the user intends to receive matches a type of a message pushed by the first OTT application as a cross-OTT information receiving user of the message that is to be sent by the server corresponding to the first OTT application; and sending a message that is to be sent by the server corresponding to the first OTT application.

9. The method according to claim 8, wherein the sending a message that is to be sent by the server corresponding to the first OTT application includes:

for each determined cross-OTT information receiving user, sending, by using a server accessed by the cross-OTT information receiving user, the received message that is sent by the server corresponding to the first OTT application, or directly sending the received message that is sent by the server corresponding to the first OTT application.

10. The method according to claim 9, wherein for each determined cross-OTT information receiving user, after the received message that is sent by the server corresponding to the first OTT application is acquired, and before the received message is sent to the cross-OTT information receiving user by using the server accessed by the cross-OTT information receiving user, acquired access information of the cross-OTT information receiving user is stored.

11. The method according to claim 10, wherein acquiring the access information of the cross-OTT information receiving user includes:

if the cross-OTT information receiving user accesses another server, receiving access information that is sent by the server accessed by the cross-OTT information receiving user; or if the cross-OTT information receiving user accesses the server, acquiring the access information of the cross-OTT information receiving user directly from the server.

* * * * *